US007649833B2

(12) United States Patent
Sadri et al.

(10) Patent No.: US 7,649,833 B2
(45) Date of Patent: Jan. 19, 2010

(54) MULTICHANNEL ORTHOGONAL FREQUENCY DIVISION MULTIPLEXED RECEIVERS WITH ANTENNA SELECTION AND MAXIMUM-RATIO COMBINING AND ASSOCIATED METHODS

(75) Inventors: Ali S Sadri, San Diego, CA (US); Alexander A. Maltsev, Nizhny Novgorod (RU); Sergey E Sergeyev, Nizhny Novgorod (RU); Alexei V Dayydov, Nizhny Novgorod (RU); Vadim S Sergeyev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 1090 days.

(21) Appl. No.: 10/749,903

(22) Filed: Dec. 29, 2003

(65) Prior Publication Data

US 2005/0141412 A1 Jun. 30, 2005

(51) Int. Cl.
*H04J 11/00* (2006.01)
(52) U.S. Cl. .................. 370/208; 370/210; 370/334; 375/260
(58) Field of Classification Search .......... 370/208, 370/210, 329, 334, 480; 375/260
See application file for complete search history.

(56) References Cited

U.S. PATENT DOCUMENTS

| 6,430,441 | B1 | 8/2002 | Levine | |
|---|---|---|---|---|
| 6,603,961 | B1 * | 8/2003 | Kuroda | 370/206 |
| 7,020,095 | B2 * | 3/2006 | Chini et al. | 370/252 |
| 7,065,171 | B1 * | 6/2006 | Hilborn et al. | 375/355 |
| 7,333,556 | B2 | 2/2008 | Maltsev et al. | |
| 7,570,953 | B2 | 8/2009 | Maltsev et al. | |
| 2001/0031014 | A1 | 10/2001 | Subramanian et al. | |
| 2001/0031016 | A1 | 10/2001 | Seagraves | |

(Continued)

FOREIGN PATENT DOCUMENTS

EP 1240918 A2 9/2002

(Continued)

OTHER PUBLICATIONS

"International Search Report for corresponding PCT Application No. PCT/US2004/043056". (Apr. 1, 2005), 4 pgs.

(Continued)

*Primary Examiner*—Steven H Nguyen
*Assistant Examiner*—Phuongchau B Nguyen
(74) *Attorney, Agent, or Firm*—Schwegman, Lundberg & Woessner, P.A.; Gregory J. Gorrie

(57) ABSTRACT

A reconfigurable multichannel receiver may selectively operate in increased throughput modes and/or increased range modes. In some embodiments, the receiver may select two or more antennas from a plurality of spatially diverse antennas to receive more than one subchannel of a wideband orthogonal frequency division multiplexed (OFDM) channel. Maximum-ratio combining may be performed on corresponding symbol-modulated subcarriers from the two or more antennas, and a single OFDM symbol may be generated from contributions from the subchannels received by the two or more antennas. In other embodiments, more than one subchannel of a wideband OFDM channel may be received through a single antenna selected from a plurality of spatially diverse antennas. In other embodiments, a single subchannel may be received by a plurality of spatially diverse antennas and maximum-ratio combining may be performed on corresponding symbol-modulated subcarriers received by the antennas.

11 Claims, 7 Drawing Sheets

U.S. PATENT DOCUMENTS

| | | | |
|---|---|---|---|
| 2002/0009155 A1 | 1/2002 | Tzannes | |
| 2002/0160737 A1* | 10/2002 | Crawford | 455/272 |
| 2003/0043732 A1 | 3/2003 | Walton et al. | |
| 2003/0083703 A1 | 5/2003 | Zhu et al. | |
| 2003/0125040 A1 | 7/2003 | Walton et al. | |
| 2003/0139196 A1 | 7/2003 | Medvedev et al. | |
| 2003/0165131 A1* | 9/2003 | Liang et al. | 370/335 |
| 2003/0204210 A1 | 10/2003 | Ousdigian et al. | |
| 2003/0208241 A1 | 11/2003 | Bradley et al. | |
| 2003/0223354 A1 | 12/2003 | Olszewski | |
| 2004/0258174 A1 | 12/2004 | Shao et al. | |
| 2005/0031047 A1 | 2/2005 | Maltsev et al. | |
| 2005/0088959 A1 | 4/2005 | Kadous | |
| 2005/0113041 A1* | 5/2005 | Polley et al. | 455/105 |
| 2005/0152465 A1 | 7/2005 | Maltsev et al. | |
| 2005/0152466 A1 | 7/2005 | Maltsev et al. | |
| 2005/0215264 A1 | 9/2005 | Subramaniam et al. | |
| 2005/0245197 A1 | 11/2005 | Kadous et al. | |
| 2006/0087972 A1 | 4/2006 | Jalali et al. | |
| 2006/0166634 A1* | 7/2006 | Ido | 455/277.1 |

FOREIGN PATENT DOCUMENTS

| | | |
|---|---|---|
| EP | 1411647 A2 | 4/2004 |
| GB | 2384651 | 7/2003 |
| JP | 2003283405 | 10/2003 |
| WO | WO-03/047198 A2 | 6/2003 |
| WO | WO-03/073682 | 9/2003 |
| WO | WO-2004/047354 A1 | 6/2004 |
| WO | WO-2005/067171 A1 | 7/2005 |
| WO | WO-2005/071912 A1 | 8/2005 |

OTHER PUBLICATIONS

"Supplement to IEEE Standard for Information Technology- Telecommunications and Information Exchange Between Systems- Local and Metropolitan Area Networks—Specific Requirements—Part 11: Wireless LAN Medium Access Control (MAC) and Physical Layer (PHY)", *IEEE STD 802.11A-1999*, (Dec. 30, 1999), 90 pgs.

Bangerter, B., et al., "High-Throughput Wireless LAN Air Interface", *Intel Technology Journal*. 7 (3), http://developer.intel.com/technology/itj/index.htm, Aug. 19, 2003), 47-57.

Choi, Byoungjo, et al., "Optimum Mode-Switching-Assisted Constant-Power Single- and Multicarrier Adaptive Modulation", *IEEE Transactions on Vehicular Technology*, 52(3), (May 2003), 536-560.

Dammann, A., et al., "Transmit/Receive—Antenna—Diversity Techniques For OFDM Systems", *European Transactions on Telecommunications*, 13 (5), (Sep. 2002), 531-538.

Fujino, Y., et al., "Transmitter With Antenna Array For MC-CDMA Forward Link", *IEEE Antennas and Propagation Society International Symposium*, (Jun. 22, 2003), 847-850.

Hutter, A. A., et al., "Effects of Fading Correlation on Multiple Antenna Reception Mobile OFDM Systems", *IEEE Vehicular Technology Conference*, (Sep. 24, 2000), 2744-2749.

Sandhu, S., et al., "Analog Combining of Multiple Receive Antennas With OFDM", *IEEE International Conference on Communications*, (May 11, 2003), 3428-3432.

Simoens, S, et al., "Optimum Performance of Link Adaptation in HIPERLAN/2 Networks", *VTC 2001 Spring. IEEE VTS 53rd Vehicular Technology Conference*, 2001, vol. 2 of 4, (May 6-9, 2001), 1129-1133.

Slimane, B. S., "A Low Complexity Antenna Diversity Receiver For OFDM Based Systems", *IEEE International Conference on Communications*, (Jun. 6, 2001), 1147-1151.

Tian, Q., et al., "The Performance of Multi-Carrier CDMA with Base Station Antenna Arrays in Fading Channels", *Vehicular Technology Conference*, (May 15, 2000), 1498-1502.

Yih, C.-H., et al., "Adaptive Modulation, Power Allocation and Control for OFDM Wireless Networks", *Personal, Indoor and Mobile Radio Communication*, 2, (2000), 809-813.

Yuan, H., et al., "An Adaptive Array Antenna with Path Selection of OFDM Signal", *European Personal Mobile Communications Conference.*, (Apr. 22, 2003), 412-416.

Zhen, L., et al., "A Modified Sub-Optimum Adaptive Bit and Power Allocation Algorithm in Wideband OFDM System", *CCECE 2003 Canadian Conf. on Electrical and Computer Engineering*, vol. 3 of 3, (May 4, 2003), 1589-1592.

Abdul Aziz, M. K., et al., "Indoor throughput and range improvements using standard compliant AP antenna diversity in IEEE 802.11a and ETSI HIPERLAN/2", *VTC 2001 Fall. IEEE VTS 54th Vehicular Technology Conference*, 2001, vol. 4, (Oct. 7-11, 2001), 2294-2298.

Cioffi, John M., "Lectures on Digital Communications", *Stanford University*, Available from http://www.stanford.edu/class/ee379c/, (2001), 278-314.

Leke, A, et al., "A maximum rate loading algorithm for discrete multitone modulation systems", *GLOBECOM '97, Global Telecommunications Conference*, 1997, vol. 3, (Nov. 8, 1997), 1514-1518.

"Written Opinion for corresponding PCT Application No. PCT/US2004/043056", (Apr. 1, 2005), 9 pgs.

"U.S. Appl. No. 10/862,535 Response filed Feb. 15, 2008 to Non-Final Office Action mailed Dec. 14, 2007", 20 pgs.

"U.S. Appl. No. 10/815,035, Non-Final Office Action mailed May 25, 2007", 11 pgs.

"U.S. Appl. No. 10/815,035, Response filed Jul. 24, 2007 to Non-Final Office Action mailed May 25, 2007", 26 pgs.

"U.S. Appl. No. 10/862,535 Response filed Sep. 24, 2008 to Final Office Action mailed Jul. 8, 2008", 16 pgs.

"U.S. Appl. No. 10/862,535, Preliminary Amendment filed Jun. 7, 2004", 14 pgs.

"U.S. Appl. No. 10/862,535 Final Office Action mailed Jul. 8, 2008.", 19 pgs.

* cited by examiner

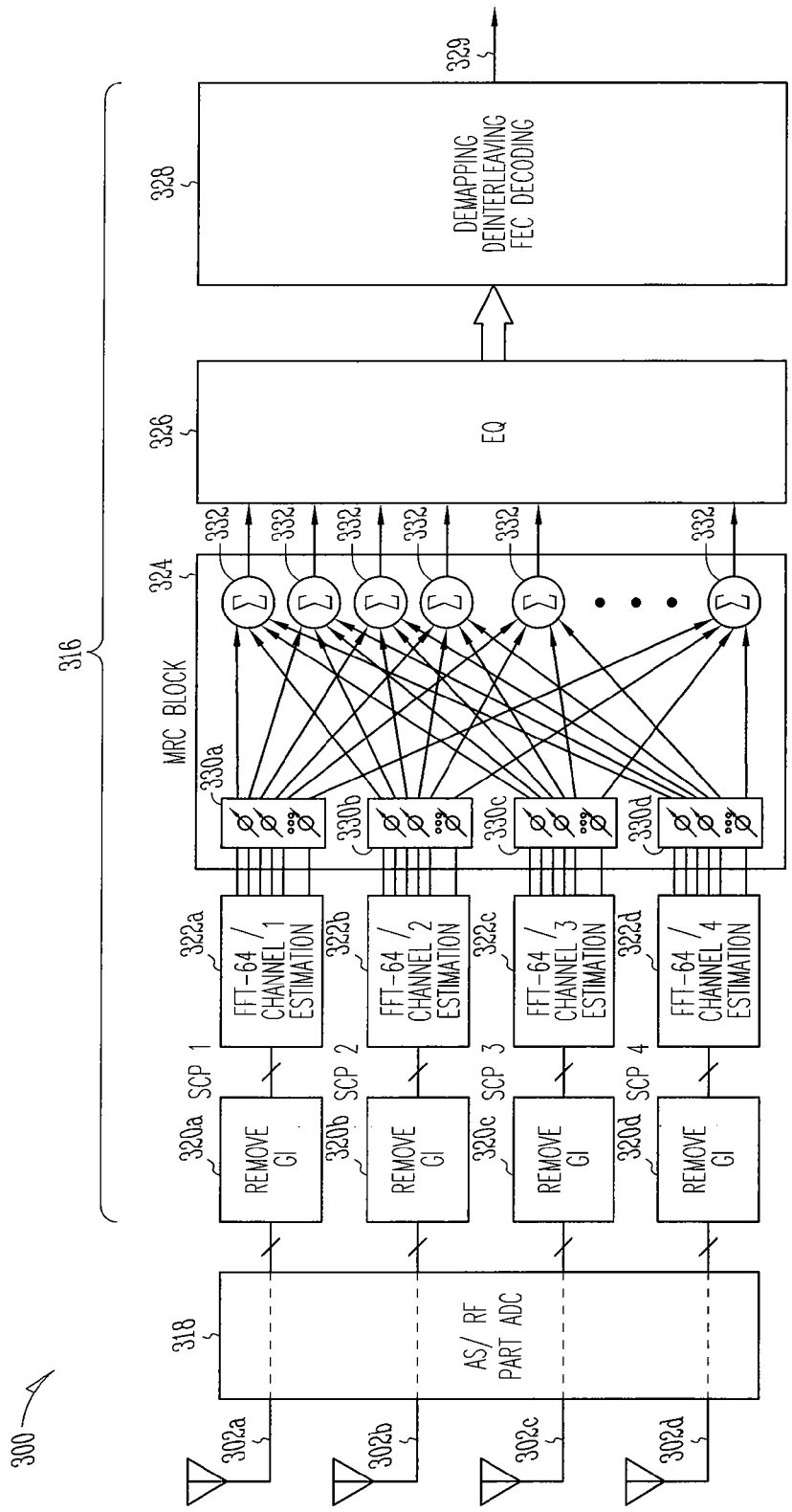

MULTICHANNEL ORTHOGONAL FREQUENCY DIVISION MULTIPLEXED RECEIVERS WITH ANTENNA SELECTION AND MAXIMUM-RATIO COMBINING AND ASSOCIATED METHODS

TECHNICAL FIELD

Embodiments of the present invention pertain to wireless electronic communications, and in some embodiments, the present invention pertains to orthogonal frequency division multiplexed (OFDM) communications.

BACKGROUND

Many modern digital communication systems, including wireless local-area networks (WLANs), are using symbol-modulated orthogonal subcarriers as a modulation scheme to help signals survive in environments having multipath reflections and/or strong interference. Orthogonal frequency-division multiplexing (OFDM) is an example of a multi-carrier transmission technique that uses symbol-modulated orthogonal subcarriers to transmit information within an available spectrum.

One problem with many WLAN receivers, including OFDM receivers, is that they are limited by their hardware configuration as to the particular channels they can receive as well as the bandwidth of those channels. This leaves such receivers inflexible as to tradeoffs between throughput and range. WLAN receivers, including OFDM receivers, should be able to receive both legacy channels, such as channels in accordance with Institute of Electrical and Electronics Engineers (EEEE) standard 802.11 (a), as well as wideband channels for high-throughput operations. These requirements make it difficult to make tradeoffs between throughput and range, especially when operating in high-throughput and/or wideband modes. Thus, there are general needs for transceivers, including receivers, and methods of communicating OFDM signals that provide flexibility between throughput and range in WLANs.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

FIGS. 3A & 3B are block diagrams of a receiver in accordance with some embodiments of the present invention.

DETAILED DESCRIPTION

Figure 1A:
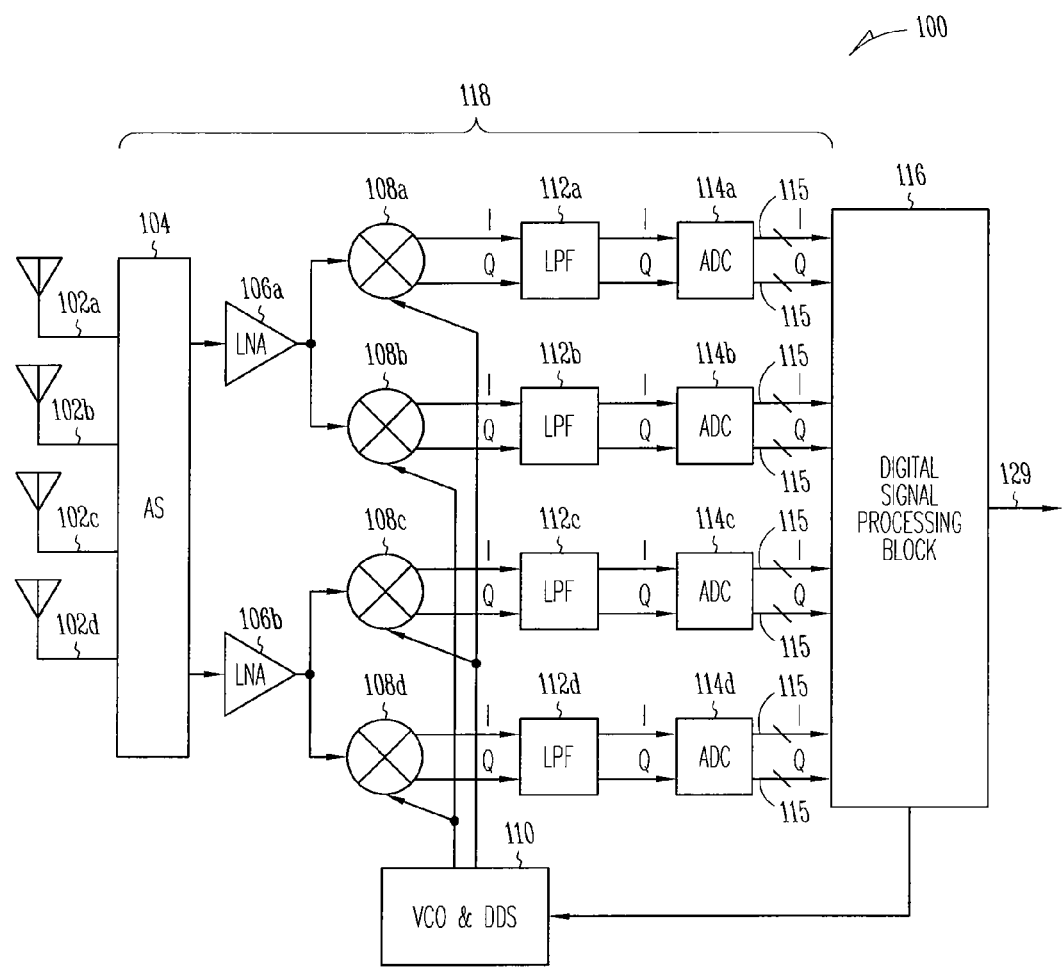
FIGS. 1A & 1B are block diagrams of a receiver in accordance with some embodiments of the present invention.

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims. Such embodiments of the invention may be referred to, individually or collectively, herein by the term "invention" merely for convenience and without intending to voluntarily limit the scope of this application to any single invention or inventive concept if more than one is in fact disclosed.

FIGS. 1A & 1B, FIGS. 2A & 2B, and FIGS. 3A & 3B illustrate some embodiments of various receiver configurations in accordance with the invention. Receiver configurations 100 (FIGS. 1A & 1B), 200 (FIGS. 2A & 2B) and 300 (FIGS. 3A & 3B) may be part of a wireless communication device, and they may receive orthogonal frequency division multiplexed (e.g., OFDM) communication signals. In some embodiments, the receivers may receive an OFDM packet comprising several OFDM symbols over a wideband communication channel. The wideband channel may comprise one or more subchannels. The subchannels may be frequency-division multiplexed (i.e., separated in frequency) and may be within a predetermined frequency spectrum. The subchannels may comprise a plurality of orthogonal subcarriers. In some embodiments, the orthogonal subcarriers of a subchannel may be closely spaced OFDM subcarriers. To achieve orthogonality between closely spaced subcarriers, in these embodiments, the subcarriers of a particular subchannel may have a null at substantially a center frequency of the other subcarriers of that subchannel.

Receiver configurations 100 (FIGS. 1A & 1B), 200 (FIGS. 2A & 2B) and 300 (FIGS. 3A & 3B) may be reconfigurable multichannel receivers that may selectively operate in increased throughput modes and/or increased range modes. In some embodiments, receiver configuration 100 (FIGS. 1A & 1B) may select two or more antennas from a plurality of spatially diverse antennas to receive more than one subchannel of a wideband OFDM channel. Maximum-ratio combining may be performed on corresponding symbol-modulated subcarriers from the two or more antennas, and a single OFDM symbol may be determined from contributions from the subchannels received by the two or more antennas. In other embodiments, receiver configuration 200 (FIGS. 2A & 2B) may receive more than one subchannel of a wideband OFDM channel with a single antenna selected from a plurality of spatially diverse antennas. In some other embodiments, receiver configuration 300 (FIGS. 3A & 3B) may receive a single subchannel with more than one of a plurality of spatially diverse antennas and maximum-ratio combining may be performed on corresponding symbol-modulated subcarriers received by the different antennas.

In accordance with some embodiments, receiver configurations 100 (FIGS. 1A & 1B), 200 (FIGS. 2A & 2B) and 300 (FIGS. 3A & 3B) may receive symbol-modulated subcarriers in accordance with individual subcarrier modulation assignments. This may be referred to as adaptive bit loading (ABL). Accordingly, one or more bits may be represented by a symbol modulated on a subcarrier. The modulation assignments for the individual subchannels may be based on the channel characteristics or channel conditions for that subcarrier, although the scope of the invention is not limited in this respect. In some embodiments, the subcarrier modulation assignments may range from zero bits per symbol to up to ten or more bits per symbol. In terms of modulation levels, the subcarrier modulation assignments may comprise binary phase shift keying (BPSK), which communicates one bit per symbol, quadrature phase shift keying (QPSK), which communicates two bits per symbol, 8 PSK, which communicates three bits per symbol, 16-quadrature amplitude modulation (16-QAM), which communicates four bits per symbol, 32-QAM, which communicates five bits per symbol, 64-QAM, which communicates six bits per symbol, 128-QAM, which communicates seven bits per symbol, and 256-QAM, which communicates eight bits per symbol. Modulation orders with higher data communication rates per subcarrier may also be used.

An OFDM symbol may be viewed as the combination of the symbols modulated on the individual subcarriers. Because of the variable number of bits per symbol-modulated subcarrier and the variable number of subchannels that may comprise a wideband channel, the number of bits per OFDM symbol received by the receivers may vary greatly. For example, in some embodiments, a receiver may receive over a wideband channel that may comprise up to four or more subchannels having bandwidths of approximately 20 MHz, and each of the subchannels may have up to 48 or more orthogonal data subcarriers having a spacing therebetween of approximately 312.5 kHz. In other embodiments, a receiver may receive an OFDM symbol over a single subchannel.

In some embodiments, the frequency spectrums for a wideband channel may comprise subchannels in either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable.

In some embodiments, receiver configurations 100 (FIGS. 1A & 1B), 200 (FIGS. 2A & 2B) and 300 (FIGS. 3A & 3B) may be part of a personal digital assistant (PDA), a laptop or portable computer with wireless communication capability, a web tablet, a wireless telephone, a wireless headset, a pager, an instant messaging device, a digital camera, an access point or other device that may receive and/or transmit information wirelessly. In some embodiments, the receivers may receive radio-frequency communications in accordance with specific communication standards, such as the Institute of Electrical and Electronics Engineers (IEEE) standards including the IEEE 802.11(a), 802.11(b), 802.11(g/h) and/or 802.16 standards for wireless local area network communications, although the receivers may also be suitable to receive communications in accordance with other techniques including the Digital Video Broadcasting Terrestrial (DVB-T) broadcasting standard, and the High performance radio Local Area Network (HiperLAN) standard.

In some embodiments, the receivers may use up to four spatially diverse antennas to exploit up to four 20 MHz channels. In some embodiments, a 20 MHz channel may be referred to as a single subchannel of a wideband channel.

In accordance with some embodiments of receiver configuration 100 (FIGS. 1A & 1B), two 20 MHz subchannels may be used to support wideband channel operation of 40 MHz bandwidth with adaptive maximum-ratio combining on each subcarrier involving two active antennas. In some of these embodiments, receiver configuration 100 may simultaneously implement an antenna selection technique that chooses a pair of active antennas with the best receiving conditions from four antennas. These embodiments may provide a throughput of up to 108 Mbps with mid-range operation capabilities, although the scope of the present invention is not limited in this respect. In some embodiments, receiver configuration 100 may be part of a transceiver that may choose the two least loaded subchannels of four subchannels for data transmission to help reduce collisions.

In accordance with some embodiments of receiver configuration 200 (FIGS. 2A & 2B), four 20 MHz subchannels may be used to support wideband channel operations of 80 MHz bandwidth with adaptive antenna selection that may choose one antenna with the best receiving conditions of four antennas for transmitting and/or receiving. These embodiments may provide a throughput of up to 216 Mbps with a possible reduction in range, although the scope of the present invention is not limited in this respect.

In accordance with some embodiments of receiver configuration 200 (FIGS. 2A & 2B), three 20 MHz subchannels may be used to support wideband channel operation of 60 MHz bandwidth with adaptive antenna selection that may choose one antenna with the best receiving conditions of four for transmitting and/or receiving. These embodiments may provide a throughput up to 162 Mbps with an improved range, although the scope of the present invention is not limited in this respect.

In accordance with some embodiments of receiver configuration 300 (FIGS. 3A & 3B), one subchannel may be received with four antennas with adaptive maximum-ratio combining on each subcarrier. In these embodiments, receiver configuration 300 may support transceiver configurations with possibly significantly improved range capabilities and throughput of up to 54 Mbps, although the scope of the present invention is not limited in this respect. In some embodiments, receiver configuration 300 may be part of a transceiver that may choose a least loaded subchannel of four band subchannels for data transmission to help reducing collisions.

Figure 2A:
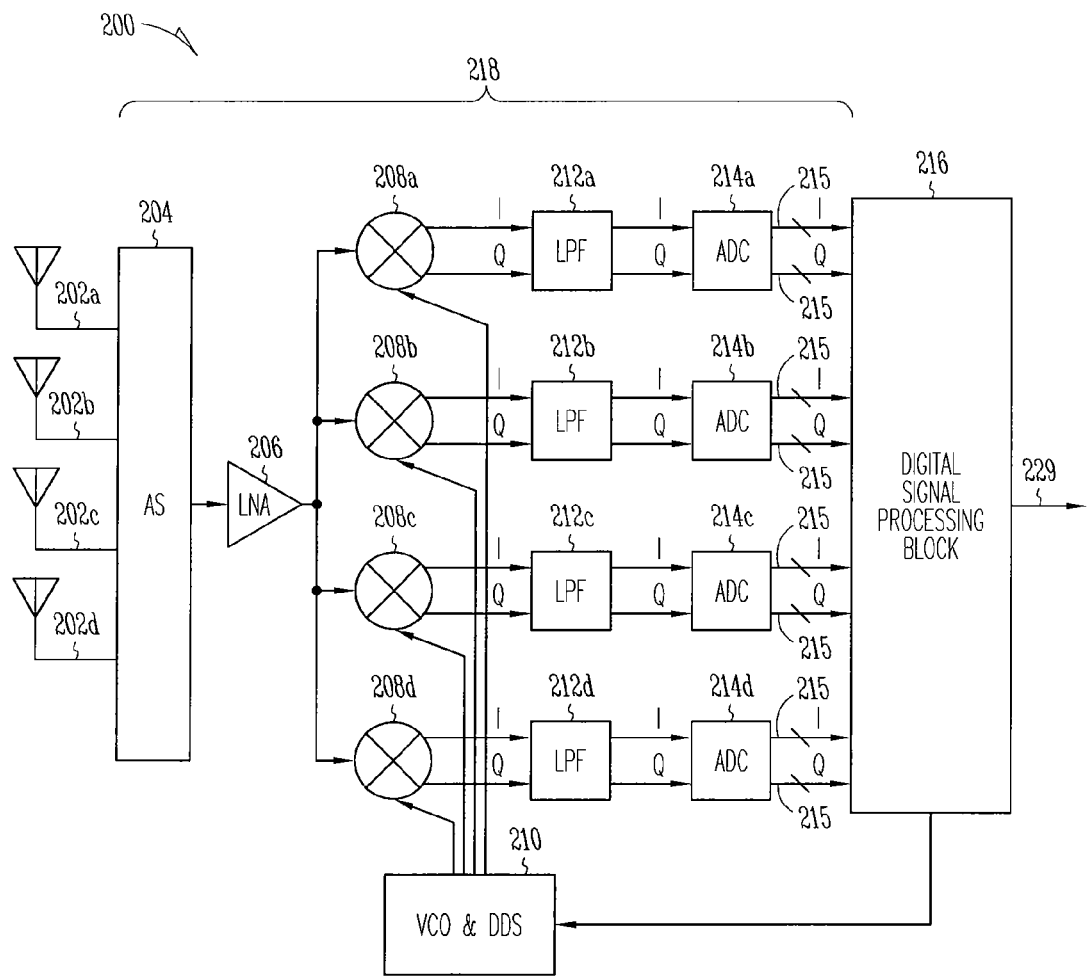
FIGS. 2A & 2B are block diagrams of a receiver in accordance with some embodiments of the present invention.
Figure 2B:
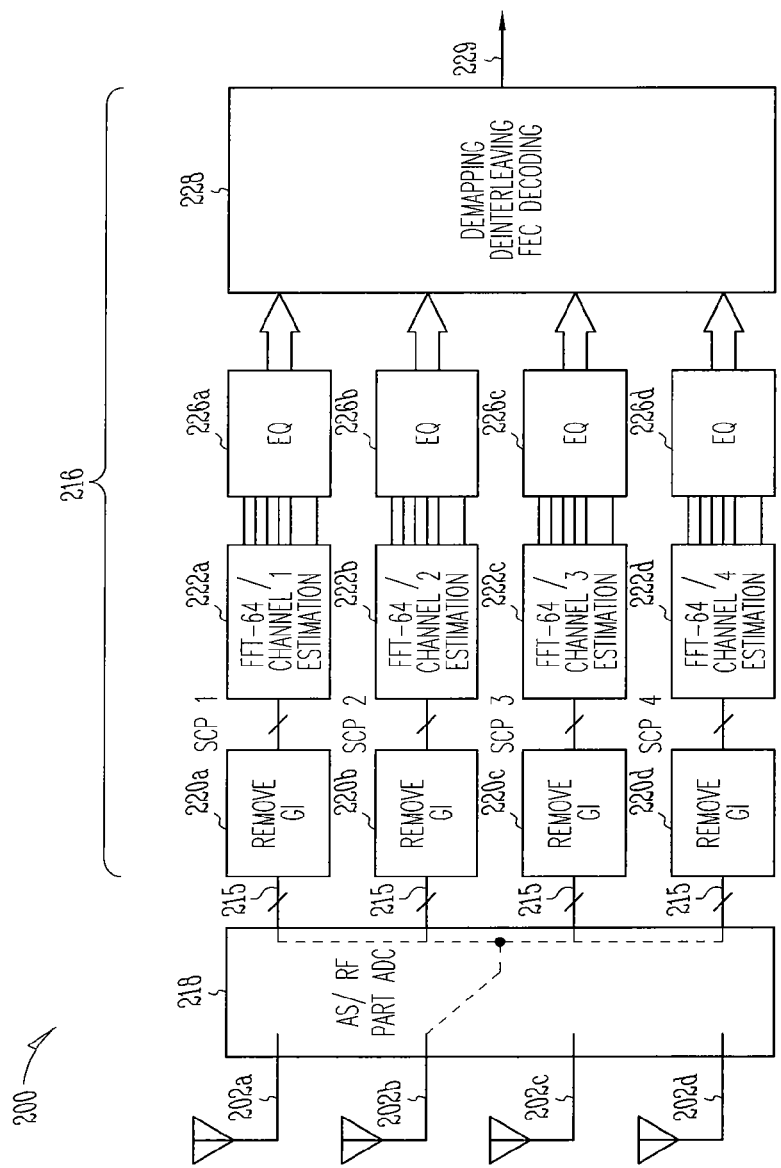
Figure 3A:
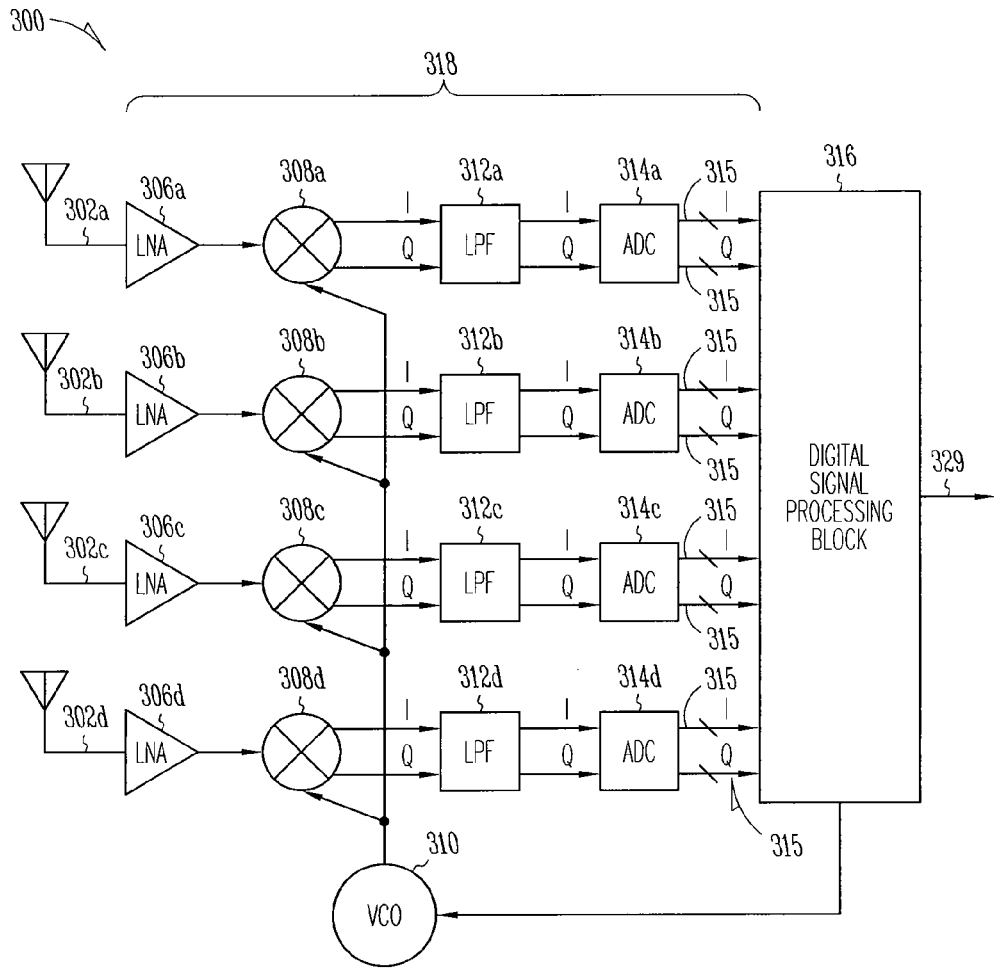

Although receiver configurations 100 (FIGS. 1A & 1B), 200 (FIGS. 2A & 2B) and 300 (FIGS. 3A & 3B) are illustrated separately, in some embodiments, the present invention also provides a single reconfigurable receiver that may operate in accordance with the functionality of receiver configurations 100 (FIGS. 1A & 1B), 200 (FIGS. 2A & 2B) and 300 (FIGS. 3A & 3B). In addition, embodiments of the present invention also include transceivers that comprise transmitter circuitry, as well as receiver circuitry, to transmit communication signals that may be received by receivers in accordance with receiver configurations 100 (FIGS. 1A & 1B), 200 (FIGS. 2A & 2B) and/or 300 (FIGS. 3A & 3B).

Figure 1B:
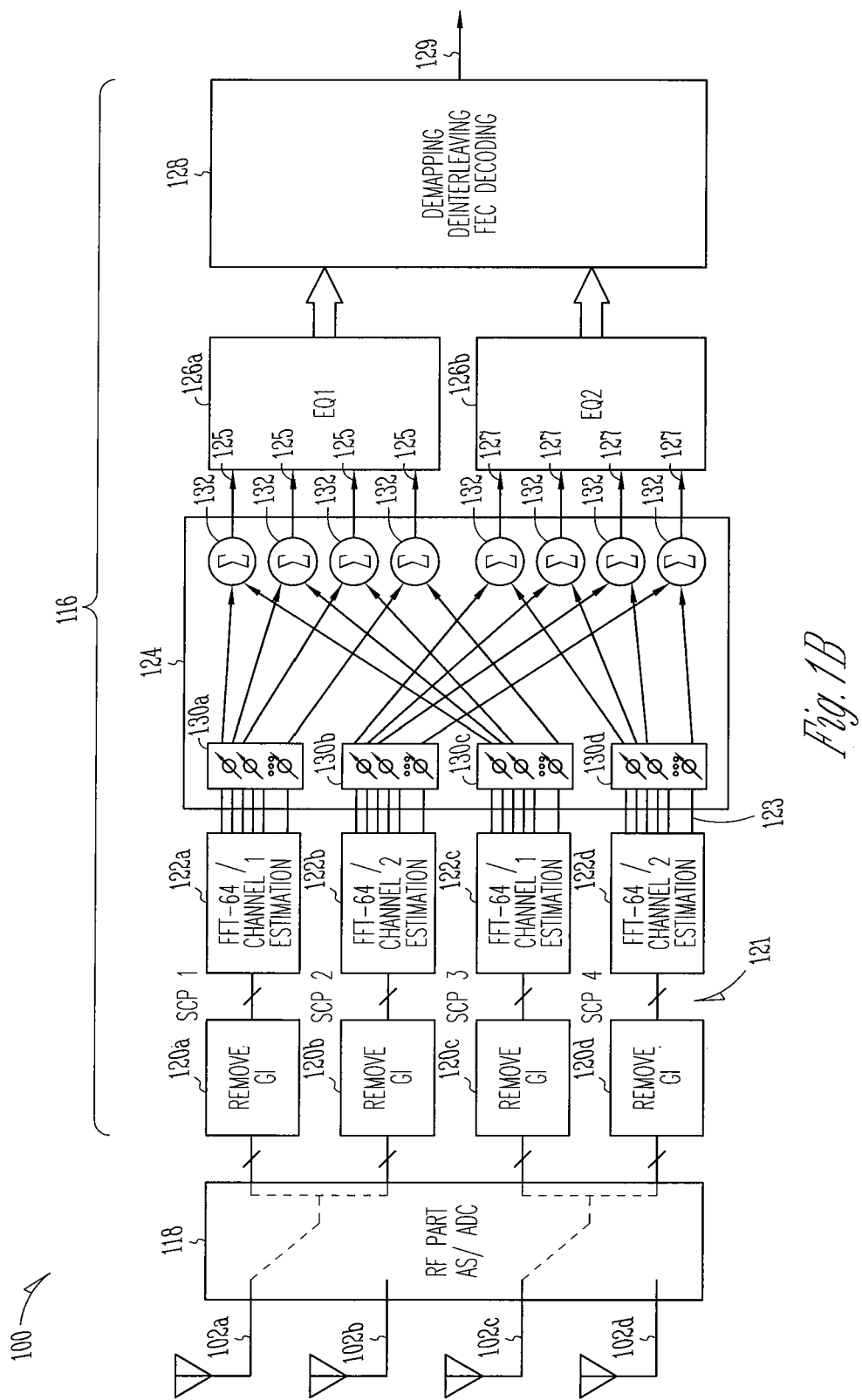

In referring to FIGS. 1A & 1B, receiver configuration 100 includes antenna selection (AS) circuitry 104 to select more than one antenna of a plurality of spatially diverse antennas 102*a-d* to receive an orthogonal frequency division multiplexed symbol over a wideband channel. The wideband channel may comprise more than one of a plurality of frequency-separated subchannels. Receiver configuration 100 may also include combining circuitry 124 to combine corresponding frequency domain symbol-modulated subcarriers 123 from the selected antennas to generate combined symbol-modulated subcarriers 125 and 127 for each subchannel of the wideband channel.

In some embodiments, antenna selection circuitry 104 may select a first antenna of the plurality of antennas 102*a-d* to receive two subchannels of a wideband channel, and the antenna selection circuitry 104 may also select a second antenna of the plurality of antennas 102*a-d* to further receive the two subchannels of the wideband channel. In some embodiments, antenna selection circuitry 104 may select two of antennas to receive two subchannels simultaneously. In some embodiments, antenna selection circuitry 104 may select the first and the second antennas based on a signal-to-noise ratio (SNR) of signals in the wideband channel. In some embodiments, antenna selection circuitry 104 may select the first and the second antennas based on an average SNR of signals in the wideband channel. In some embodiments, antenna selection circuitry may select the two antennas with the best average SNR for both subchannels.

Receiver configuration 100 may utilize low-noise amplifiers (LNAs) 106a-b for each selected antenna to amplify RF signals of more than one subchannel, and downconversion circuitry 108 to individually downconvert RF signals for each subchannel that is received through each antenna. For example, when two subchannels are received through two of antennas 102a-d, receiver configuration 100 may include first downconversion circuitry 108a to downconvert RF signals of the first subchannel received by the first antenna, second downconversion circuitry 108b to downconvert RF signals of the second subchannel received by the first antenna, third downconversion circuitry 108c to downconvert RF signals of the first subchannel received by the second antenna, and fourth downconversion circuitry 108d to downconvert RF signals of the second subchannel received by the second antenna. In embodiments, first low-noise amplifier 106a may amplify the RF signals from the first antenna, and second low-noise amplifier 106b may amplify the RF signals from the second antenna, although the scope of the invention is not limited in this respect. As illustrated, downconversion circuitry 108 may provide both in-phase (I-channel) components and quadrature-phase (Q-channel) components, although the scope of the invention is not limited in this respect.

In some embodiments, heterodyne frequency generating circuitry 110 may selectively generate one or more heterodyne frequencies to convert RF signals of the particular subchannels to baseband. The particular heterodyne frequency may depend on the particular subchannel. In some embodiments when two subchannels are received through two of antennas 102a-d, heterodyne frequency generating circuitry 110 may provide a first heterodyne frequency to first and third downconversion circuitry 108a and 108c to downconvert a first subchannel to baseband, and heterodyne frequency generating circuitry 110 may provide a second heterodyne frequency to second and fourth downconversion circuitry 108b and 108d to downconvert a second subchannel to baseband.

In some embodiments, heterodyne frequency generating circuitry 110 may comprise a fixed frequency voltage controlled oscillator (VCO) to generate a constant reference frequency, and a direct digital synthesizer (DDS) to generate a selected one of a plurality of stepped frequencies. Heterodyne frequency generating circuitry 110 may also comprise a frequency combiner to combine the reference frequency and the selected one of the stepped frequencies to generate the proper heterodyne frequency for each downconversion circuitry 108. In some embodiments, heterodyne frequency generating circuitry 110 may further comprise a phase-locked loop (PLL) synthesizer and a frequency divider to operate with the VCO to generate the heterodyne frequencies. Other configurations for selectively generating heterodyne frequencies may also be suitable for use with embodiments of the present invention.

Receiver configuration 100 may also include low-pass filters (LPFs) 112a-d to filter and/or accumulate signal information received from associated downconversion circuitry 108 and analog-to-digital conversion (ADC) circuitry 114a-d to generate digital signals 115 for each subchannel received through each antenna. In some embodiments, digital signals 115 may comprise a serial symbol stream for each subchannel received through each antenna. Digital signals 115 provided by portion 118 of receiver configuration 100 may be processed in digital signal processing circuitry 116 to demodulate an OFDM symbol. In some embodiments, analog-to-digital conversion circuitry 114a-d may provide a serial symbol stream for both the I and Q channel components. In the embodiments illustrated in FIGS. 1A & 1B, four single channel pipelines (SCPs) are shown. A single channel pipeline is shown for each of two subchannels that are received by each of the two antennas; however the scope of the invention is not limited in this respect.

In some embodiments, receiver configuration 100 may also include circuitry 120a-d to remove a cyclic extension and/or guard interval (GI) from the serial symbol streams provided by analog-to-digital conversion circuitry 114a-d, although the scope of the present invention is not limited in this respect. Serial symbol streams 121 may be converted to a parallel form for processing by fast Fourier transform (FFT) circuitry 122a-d. FFT circuitry 122a-d may perform a fast Fourier transform on the parallel groups of time-domain samples to generate frequency domain symbol-modulated subcarriers 123. In some embodiments, FFT circuitry 122a-d may also generate a channel estimate for each subcarrier of the received subchannels based on receipt of training symbols, although the scope of the present invention is not limited in this respect.

Combining circuitry 124 may combine corresponding frequency domain symbol-modulated subcarriers of the same subchannel (received by different antennas) to generate combined symbol-modulated subcarriers 125 and 127. In some embodiments, combined symbol-modulated subcarriers 125 may be associated with a first subchannel, and combined symbol-modulated subcarriers 127 may be associated with a second subchannel, although the scope of the invention is not limited in this respect.

In some embodiments, combining circuitry 124 comprises maximum-ratio combining (MRC) circuitry having complex (i.e., I and Q) weighters 130a-d to weight the frequency domain symbol-modulated subcarriers prior to proportionally combining the corresponding frequency domain symbol-modulated subcarriers substantially proportional to their signal strength in combiners 132. In these embodiments, weighters 130a-d may, in addition to weighting, correct, adjust and/or phase-rotate a frequency domain symbol-modulated subcarrier to allow coherent signal combining in combiners 132.

Receiver configuration 100 may also include equalizer circuitry 126a-b to perform a channel equalization on symbol-modulated subcarriers 125 and 127, which may be received in parallel for each subcarrier. The channel equalization may be based on channel estimates provided by the FFT circuitry. In some embodiments, equalizer circuitry 126a-b may perform separate channel equalizations on the combined symbol-modulated subcarriers of an associated subchannel provided by the combining circuitry, although the scope of the present invention is not limited in this respect.

In some embodiments, equalizer circuitry 126a-b may perform a channel equalization for further demapping the combined symbol-modulated subcarriers of each subchannel to generate parallel groups of bits from the subcarriers. Additional processing circuitry 128 may generate a single decoded bit stream, which may represent the orthogonal frequency division multiplexed symbol, from the parallel groups of bits of more than one subchannel. In some embodiments, additional processing circuitry 128 may include demapping circuitry, deinterleaving circuitry and/or decoding circuitry to generate the demodulated OFDM symbol. In some embodiments, subcarrier demappers may demap the subcarriers of each subchannel in accordance with individual subcarrier modulation assignments particular to the subchannel to generate the parallel groups of bits. In some embodiments, a parallel-to-serial conversion may be performed prior to deinterleaving and/or decoding, and decoded bit stream 129 may be generated.

In some embodiments, the channel estimates generated by FFT circuitry 122*a-d* may comprise a channel response across the channel bandwidth. The channel estimates may be measured based on a channel sounding preamble and may include a channel estimate for each subcarrier frequency. In some embodiments, FFT circuitry 122*a-d* may perform an FFT on known training symbols (e.g., the long training symbols) so that a channel estimation may be determined for each subchannel. In some embodiments, equalizer circuitry 126*a-b* may perform a channel equalization in the frequency domain with complex values that represent the channel estimate so that magnitudes of the frequency domain symbol-modulated subcarriers may be normalized and the phases of the frequency domain symbol-modulated subcarriers may be aligned to a zero origin to allow for further processing by circuitry 128.

In some embodiments, FFT circuitry 122*a-d* may comprise first FFT circuitry 122*a* to perform an FFT on parallel groups of time domain samples of a first subchannel from the first antenna to generate frequency domain symbol-modulated subcarriers of the first subchannel from the first antenna. FFT circuitry 122*a-d* may also include second FFT circuitry 122*b* to perform an FFT on parallel groups of time domain samples of a second subchannel from the first antenna to generate frequency domain symbol-modulated subcarriers of the second subchannel from the first antenna. FFT circuitry 122*a-d* may also include third FFT circuitry 122*c* to perform an FFT on parallel groups of time domain samples of the first subchannel from the second antenna to generate frequency domain symbol-modulated subcarriers of the first subchannel from the second antenna. FFT circuitry 122*a-d* may also include fourth FFT circuitry 122*d* to perform an FFT on parallel groups of time domain samples of the second subchannel from the second antenna to generate frequency domain symbol-modulated subcarriers of the second subchannel from the second antenna. In some embodiments, the OFDM symbol may be generated from the simultaneous receipt and processing of two subchannels through two antennas, although the scope of the invention is not limited in this respect.

In referring to FIGS. 2A & 2B, receiver configuration 200 may receive more than one subchannel of a wideband OFDM channel through a single antenna selected from a plurality of spatially diverse antennas 202*a-d*. In some embodiments, receiver configuration 200 may comprise a single channel pipeline (SCP) for processing each subchannel.

Receiver configuration 200 may comprise antenna selection circuitry 204 to select one of a plurality of spatially diverse antennas 202*a-d* to receive an orthogonal frequency division multiplexed symbol over a wideband channel comprising more than one of a plurality of subchannels. LNA 206 may amplify the RF signals, and each subchannel may be separately downconverted by downconverters 208*a-d*, filtered by filters 212*a-d*, and converted to digital signals 215 by analog-to-digital conversion circuitry 214*a-d*. Digital signal processing circuitry 216 may comprise, among other things, subcarrier demodulators to demodulate frequency domain symbol-modulated subcarriers of the more than one subchannel to generate parallel groups of bits from the subcarriers. Digital signal processing circuitry 116 may also comprise additional processing circuitry to generate single decoded bit stream 229 representing the orthogonal frequency division multiplexed symbol from the more than one subchannel. In some embodiments, heterodyne frequency generating circuitry 210 may selectively generate a heterodyne frequency for each subchannel to convert RF signals of the particular subchannel to baseband.

As illustrated in FIG. 2B, digital signal processing circuitry 216 may receive digital signals 215 from portion 218 and may comprise four single channel pipelines (SCPs). In these embodiments, each single channel pipeline may process one subchannel, although the scope of the invention is not limited in this respect.

In some embodiments, receiver configuration 200 may also include circuitry 220*a-d* to remove a cyclic extension and/or guard interval (GI) from the serial symbol streams provided by analog-to-digital conversion circuitry 214*a-d*, although the scope of the present invention is not limited in this respect. The serial symbol streams may be converted to a parallel form for processing by fast Fourier transform circuitry 222*a-d*. Fast Fourier transform circuitry 222*a-d* may perform a fast Fourier transform on the parallel groups of time-domain samples to generate frequency domain symbol-modulated subcarriers. Equalizer circuitry 226*a-d* may receive the symbol-modulated subcarriers, in parallel for each subcarrier, and it may perform an equalization based on the channel estimates. After equalization, the frequency domain symbol-modulated subcarriers may be demapped, and a parallel-to-serial conversion may be performed prior to deinterleaving and/or decoding by circuitry 228 to generate decoded bit stream 229. In some embodiments, the demodulated OFDM symbol may be generated from the simultaneous receipt and processing of four subchannels through one antenna, although the scope of the invention is not limited in this respect.

In referring to FIGS. 3A & 3B, receiver configuration 300 may receive a single subchannel by a plurality of spatially diverse antennas 302*a-d*, and maximum-ratio combining may be performed on corresponding symbol-modulated subcarriers received by the antennas. In some embodiments, receiver configuration 300 may comprise circuitry 318 to receive an orthogonal frequency division multiplexed symbol over a single subchannel through a plurality of spatially diverse antennas, and combining circuitry 324 to combine corresponding frequency domain symbol-modulated subcarriers from each of the antennas to generate combined symbol-modulated subcarriers for the single subchannel. LNAs 306*a-d* may amplify the received RF signals, and the RF signals from each antenna 302 may be separately downconverted by downconverters 308*a-d*, filtered by filters 312*a-d*, and converted to digital signals 315 by analog-to-digital conversion circuitry 314 314*a-d*. Since a single subchannel is being received, the signals from each antenna may use the same heterodyne frequency for downconversion, and accordingly VCO 310 may generate a single heterodyne frequency for each downconversion circuitry 308*a-d* to downconvert the RF signals from each antenna to baseband.

In some embodiments, receiver configuration 300 may comprise a single channel pipeline (SCP) for each antenna for the signals of the same subchannel. As illustrated in FIG. 3B, digital signal processing circuitry 316 may comprise four single channel pipelines. Each pipeline may process signals from one antenna, although the scope of the invention is not limited in this respect.

In some embodiments, receiver configuration 300 may also include circuitry 320*a-d* to remove a cyclic extension and/or guard interval (GI) from the serial symbol streams provided by analog-to-digital conversion circuitry 314*a-d*, although the scope of the present invention is not limited in this respect. The serial symbol streams may be converted to a parallel form for FFT circuitry 322a-d. FFT circuitry 322a-d may perform a fast Fourier transform on the parallel groups of time-domain samples to generate frequency domain symbol-modulated subcarriers. Equalizer circuitry 326 may receive the symbol-modulated subcarriers, in a parallel form for each subcarrier, and it may perform an equalization based on the channel estimates. After equalization, the frequency domain symbol-modulated subcarriers may be demapped, and a parallel-to-serial conversion may be performed prior to deinterleaving and/or decoding by circuitry 328 to generate decoded bit stream 329. In some embodiments, the OFDM symbol may be demodulated from the simultaneous receipt and processing of one subchannel through four antennas, although the scope of the invention is not limited in this respect.

In some embodiments, combining circuitry 324 comprises maximum-ratio combining (MRC) circuitry having complex (i.e., I and Q) weighters 330a-d to weight the frequency domain symbol-modulated subcarriers prior to proportionally combining the corresponding frequency domain symbol-modulated subcarriers substantially proportional to their signal strength in combiners 332. In these embodiments, weighters 330a-d may, in addition to weighting, correct, adjust and/or phase-rotate a frequency domain symbol-modulated subcarrier to allow coherent signal combining in combiners 332. In some embodiments, receiver configuration 300 may include one of combiners 332 for each subcarrier.

Although the receiver configurations 100 (FIGS. 1A & 1B), 200 (FIGS. 2A & 2B) and 300 (FIGS. 3A & 3B) are illustrated as having several separate functional elements, one or more of the functional elements may be combined and may be implemented by combinations of software-configured elements, such as processing elements including digital signal processors (DSPs), and/or other hardware elements. For example, processing elements may comprise one or more microprocessors, DSPs, application specific integrated circuits (ASICs), and combinations of various hardware and logic circuitry for performing at least the functions described herein.

Antennas 102a-d (FIGS. 1A & 1B), 202a-d (FIGS. 2A & 2B) and 302a-d (FIGS. 3A & 3B) may comprise directional or omnidirectional antennas, including, for example, dipole antennas, monopole antennas, loop antennas, microstrip antennas or other types of antennas suitable for reception of RF signals by the receivers.

In some embodiments, a reconfigurable receiver is provided. The reconfigurable receiver may comprise antenna selection circuitry to select one or more of a plurality of spatially diverse antennas to receive one or more of a plurality of subchannels. The reconfigurable receiver may also comprise maximum-ratio combining circuitry to combine, when more than one antenna per subchannel is selected, corresponding symbol-modulated subcarrier of subchannels from different selected antennas. In some embodiments, the antenna selection circuitry may select at least one antenna of the plurality to receive either three or four subchannels when a high-throughput mode is enabled. In some embodiments, the antenna selection circuitry may select up to four of the antennas to receive a single subchannel when an increased-range mode is enabled. In some embodiments, the antenna selection circuitry may select at least two of the antennas to simultaneously receive two of the subchannels when the increased-range and the high-throughput modes are enabled. The antenna selection circuitry may select the antennas based on an average signal-to-noise ratio of the subchannels, although the scope of the invention is not limited in this respect.

In some embodiments, the reconfigurable receiver may comprise up to four or more single channel pipelines to process signals. In some embodiments, when the high-throughput mode is enabled, each single channel pipeline may process signals from an associated one of the either three or four subchannels. In some embodiments, when the increased-range mode is enabled, each single channel pipeline may process signals of the single subchannel received by an associated one of the selected antennas. In some embodiments, when the increased-range and the high-throughput modes are both enabled, a first single channel pipeline may process signals of a first subchannel received by a first of the selected antennas, a second single channel pipeline may process signals of a second subchannel received by the first antenna, a third single channel pipeline may process signals of the first subchannel received by a second of the selected antennas, and a fourth single channel pipeline may process signals of the second subchannel received by the second of the selected antennas.

Figure 4:
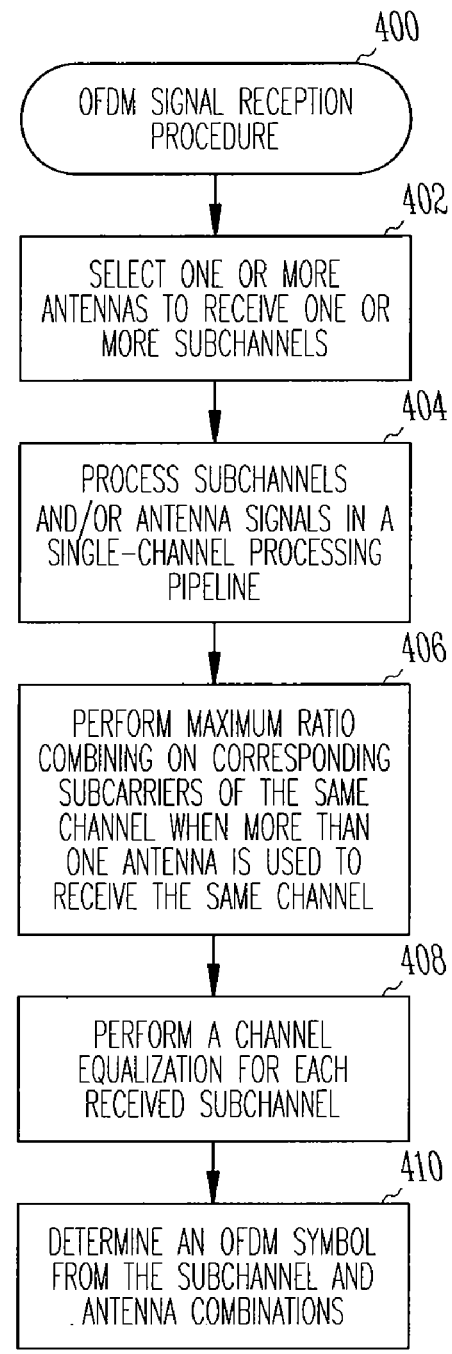
FIG. 4 is a flow chart of an OFDM signal reception procedure in accordance with some embodiments of the present invention.

FIG. 4 is a flow chart of an OFDM signal reception procedure in accordance with some embodiments of the present invention. The operations of procedure 400 may be performed by an OFDM receiver, such as a receiver in accordance with receiver configuration 100 (FIGS. 1A & 1B), receiver configuration 200 (FIGS. 2A & 2B), and/or receiver configuration 300 (FIGS. 3A & 3B), although other receivers may also be suitable to perform the operations of procedure 400. In general, procedure 400 may receive OFDM communications over one or more subchannels through one or more antennas, and it may selectively trade off between throughput and range in a WLAN environment. Although the individual operations of procedure 400 are illustrated and described as separate operations, one or more of the individual operations may be performed concurrently, and nothing requires that the operations be performed in the order illustrated.

Operation 402 may select among one or more antennas to receive one or more subchannels. In some embodiments, operation 402 may select one antenna to receive up to four or more subchannels, which may provide increased throughput with a more limited range. In other embodiments, operation 402 may select up to four or more antennas to receive a single subchannel, which may provide an increased range with reduced throughput. In yet other embodiments, operation 402 may select more than one antenna to receive more than one subchannel to provide an increased throughput and an increased range. For example, operation 402 may select two antennas to each receive two subchannels each, although the scope of the invention is not limited in this respect.

Operation 404 may process signals in single-channel pipelines. For example, when a single antenna is used to receive up to four or more subchannels, each subchannel may be processed in a single-channel pipeline. For example, when more than one antenna is used to receive a single subchannel, the same subchannel-signals from each antenna may be processed in a single-channel pipeline. For example, when more than one antenna is used to each receive more than one subchannel, each subchannel may be processed in a corresponding single-channel pipeline. The single-channel pipeline may include, among other things, downconversion, analog-to-digital conversion, and performing FFTs to generate frequency domain symbol modulated subcarriers.

Operation 406 may combine outputs of the single-channel pipelines that represent the same subchannel. For example, operation 406 may combine corresponding frequency domain symbol modulated subcarriers of the same subchannel when more than one antenna is used to receive the same subchannel. In some embodiments, operation 406 may perform a maximum-ratio combining on the corresponding frequency domain symbol modulated subcarriers, although the scope of the invention is not limited in this respect. Operation 406 may optionally not be performed in some embodiments when a single antenna is used to receive one or more subchannels, or when the single-channel pipelines are used to receive different subchannels. Operation 406 may provide combined frequency domain symbol modulated subcarriers for each subchannel that is received.

Operation 408 may perform a channel equalization on the combined frequency domain symbol modulated subcarriers for each subchannel in embodiments that receive more than one subchannel. The subcarriers may be demodulated, and parallel groups of bits may be generated. Each parallel group may correspond to a subcarrier of a subchannel.

Operation 410 may receive parallel groups of bits for each subchannel for each subchannel and may determine an OFDM symbol from the bits for each subchannel. Operation 410 may include converting the parallel groups of bits for each subchannel to a serial form that may comprise one or more serial bit streams. Operation 410 may also include performing demapping, deinterleaving and/or decoding.

In some embodiments, the selection between increased range and increased throughput may be performed by a user of a wireless communication device. In other embodiments, the selection between increased range and increased throughput may be made by an application operating on the device. In these embodiments, the selection may be based on the requirements of the application and/or channel conditions. For example, for voice communications, greater range and lower throughput may be acceptable, while for data transfer, higher throughput may be desired.

Embodiments of the invention may be implemented in one or a combination of hardware, firmware and software. Embodiments of the invention may also be implemented as instructions stored on a computer-readable medium, which may be read and executed by at least one processor to perform the operations described herein. A computer-readable medium may include any mechanism for storing or transmitting information in a form readable by a machine (e.g., a computer). For example, a computer-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention lies in less than all features of a single disclosed embodiment. Thus the following claims are hereby incorporated into the detailed description, with each claim standing on its own as a separate preferred embodiment.

What is claimed is:

1. A receiver configurable to operate in either a high-throughput mode or an increased-range mode, the receiver comprising:
   antenna selection circuitry to select more than one of a plurality of spatially diverse antennas to receive an orthogonal frequency division multiplexed (OFDM) symbol over one or more subchannels of a wideband channel comprising a plurality of the subchannels;
   a plurality of fast Fourier transform (FFT) circuitries each configured to generate frequency domain symbol-modulated subcarriers for one set of OFDM subcarriers,
   combining circuitry to combine corresponding frequency domain symbol-modulated subcarriers from the FFT circuitries to generate combined symbol-modulated subcarriers,
   wherein each subchannel of the wideband channel comprises a separate set of OFDM subcarriers,
   wherein in an increased-range mode when data is to be received on a single subchannel, each of the FFT circuitries is configured to generate frequency domain symbol-modulated subcarriers for the set of OFDM subcarriers associated with the single subchannel, and
   wherein in a high-throughput mode when data is to be received on each subchannel of the plurality of subchannels, each of the FFT circuitries is configured to generate frequency domain symbol-modulated subcarriers for a different one of the subchannels.

2. The receiver of claim 1 wherein the combining circuitry comprises maximum-ratio combining circuitry to combine the corresponding frequency domain symbol-modulated subcarriers of the subchannels, and
   wherein the combining circuitry comprises maximum-ratio combining circuitry to weight at least some of the frequency domain symbol-modulated subcarriers prior to combining the corresponding frequency domain symbol-modulated subcarriers substantially proportional to signal strength.

3. The receiver of claim 1 wherein the antenna selection circuitry it so select a first antenna of the plurality of antennas to receive the subchannels of the wideband channel,
   wherein the antenna selection circuitry is to select a second antenna of the plurality of antennas to further receive the subchannels of the wideband channel, and
   wherein the antenna selection circuitry is to select the first and the second antennas from the plurality based on an average signal-to-noise ratio of signals in the subchannels.

4. The receiver of claim 3 further comprising:
   low-noise amplifiers to amplify radio-frequency signals of at least both subchannels;
   downconversion circuitry to downconvert radio-frequency signals for each subchannel received through each antenna; and
   analog-to-digital conversion circuitry to generate digital signals for each subchannel received through each antenna.

5. The receiver of claim 1 further comprising:
   equalizer circuitry to perform separately for each of the subchannels, a channel equalization on the combined symbol-modulated subcarriers of an associated subchannel provided by the combining circuitry.

6. The receiver of claim 5 further comprising:
   subcarrier demappers to demap, after the channel equalization, the combined symbol-modulated subcarriers of each subchannel to generate parallel groups of bits from the subcarriers; and
   additional processing circuitry to generate a single decoded bit stream representing the orthogonal frequency division multiplexed symbol from the parallel groups of bits of the more than one subchannel.

7. The receiver of claim 6 wherein the subcarrier demappers are to demap the subcarriers of each subchannel in accordance with individual subcarrier modulation assignments particular to the subchannel to generate the parallel groups of bits.

8. A receiver comprising:
antenna selection circuitry to select more than one of a plurality of spatially diverse antennas to receive an orthogonal frequency division multiplexed symbol over a wideband channel comprising a plurality of subchannels; and
combining circuitry to combine corresponding frequency domain symbol-modulated subcarriers from the selected antennas to generate combined symbol-modulated subcarriers for each subchannel of the wideband channel,
wherein parallel groups of time domain samples are to be generated from each of the subchannels received by each of the antennas,
wherein the receiver further comprises fast Fourier transform circuitry to perform fast Fourier transforms on the parallel groups of time domain samples,
wherein the fast Fourier transform circuitry comprises:
first fast Fourier transform circuitry to perform a fast Fourier transform on parallel groups of time domain samples of a first subchannel from the first antenna to generate frequency domain symbol-modulated subcarriers of the first subchannel from the first antenna;
second fast Fourier transform circuitry to perform a fast Fourier transform on parallel groups of time domain samples of a second subchannel from the first antenna to generate frequency domain symbol-modulated subcarriers of the second subchannel from the first antenna;
third fast Fourier transform circuitry to perform a fast Fourier transform on parallel groups of time domain samples of the first subchannel from the second antenna to generate frequency domain symbol-modulated subcarriers of the first subchannel from the second antenna; and
fourth fast Fourier transform circuitry to perform a fast Fourier transform on parallel groups of time domain samples of the second subchannel from the second antenna to generate frequency domain symbol-modulated subcarriers of the second subchannel from the second antenna.

9. The receiver of claim 8 wherein the combining circuitry comprises maximum ratio combining circuitry to combine, for each subcarrier of the first subchannel, the frequency domain symbol-modulated subcarriers provided by the first and third fast Fourier transform circuitry to provide combined frequency domain symbol-modulated subcarriers for the first subchannel, and
wherein the maximum-ratio combining circuitry is to combine, for each subcarrier of the second subchannel, the frequency domain symbol-modulated subcarriers provided by the second and fourth fast Fourier transform circuitry to provide combined frequency domain symbol-modulated subcarriers for the second subchannel.

10. A reconfigurable receiver comprising:
antenna selection circuitry to select one or more of a plurality of spatially diverse antennas to receive one or more of a plurality of subchannels; and
maximum-ratio combining circuitry to combine, when more than one antenna per subchannel is selected, corresponding symbol-modulated subcarrier of subchannels from different selected antennas,
wherein the antenna selection circuitry is to select at least one antenna of the plurality to receive either three or four subchannels when a high-throughput mode is enabled,
wherein the antenna selection circuitry is to select up to four of the antennas to receive a single subchannel when an increased-range mode is enabled, and
wherein the antenna selection circuitry is to select at least two of the antennas to simultaneously receive two of the subchannels when the increased-range and the high-throughput modes are enabled,
wherein the antenna selection circuitry is to select the antennas based on an average signal-to-noise ratio of the subchannels.

11. A reconfigurable receiver comprising:
antenna selection circuitry to select one or more of a plurality of spatially diverse antennas to receive one or more of a plurality of subchannels; and
maximum-ratio combining circuitry to combine, when more than one antenna per subchannel is selected, corresponding symbol-modulated subcarrier of subchannels from different selected antennas,
wherein the antenna selection circuitry is to select at least one antenna of the plurality to receive either three or four subchannels when a high-throughput mode is enabled,
wherein the antenna selection circuitry is to select up to four of the antennas to receive a single subchannel when an increased-range mode is enabled,
wherein the antenna selection circuitry is to select at least two of the antennas to simultaneously receive two of the subchannels when the increased-range and the high-throughput modes are enabled,
wherein the antenna selection circuitry is to select the antennas based on an average signal-to-noise ratio of the subchannels,
wherein the receiver comprises up to four single channel pipelines to process signals, wherein
when the high-throughput mode is enabled, each single channel pipeline is to process signals from an associated one of the either three of four subchannels,
when the increased-range mode is enabled, each single channel pipeline is to process signals of the single subchannel received by an associated one of the selected antennas, and
when the increased-range and the high-throughput modes are both enabled, a first single channel pipeline is to process signals of a first subchannel received by a first of the selected antennas, a second single channel pipeline is to process signals of a second subchannel received by the first antenna, a third single channel pipeline is to process signals of the first subchannel received by a second of the selected antennas, and a fourth single channel pipeline is to process signals of the second subchannel received by the second of the selected antennas.

* * * * *

UNITED STATES PATENT AND TRADEMARK OFFICE
CERTIFICATE OF CORRECTION

PATENT NO. : 7,649,833 B2  Page 1 of 1
APPLICATION NO. : 10/749903
DATED : January 19, 2010
INVENTOR(S) : Ali S. Sadri et al.

It is certified that error appears in the above-identified patent and that said Letters Patent is hereby corrected as shown below:

In column 12, line 33, in Claim 3, delete "it so" and insert -- is to --, therefor.

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,649,833 B2 Page 1 of 1
APPLICATION NO. : 10/749903
DATED : January 19, 2010
INVENTOR(S) : Sadri et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1731 days.

Signed and Sealed this

Twenty-eighth Day of December, 2010

David J. Kappos
*Director of the United States Patent and Trademark Office*